Oct. 26, 1926.
I. D. BLOCK
FOOD PRODUCT
Filed Dec. 9, 1925
1,604,764
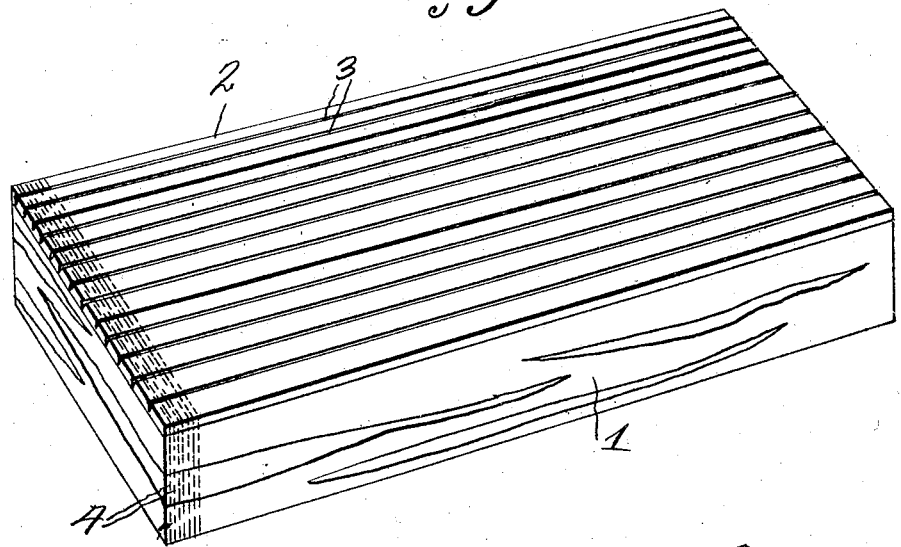
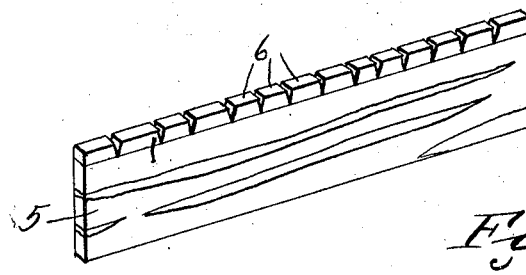
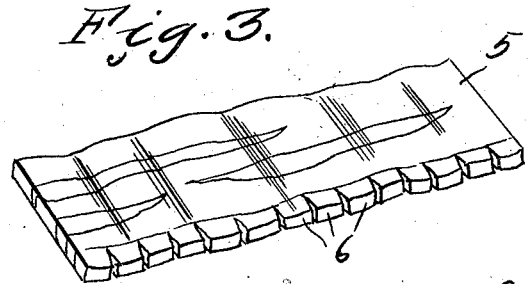
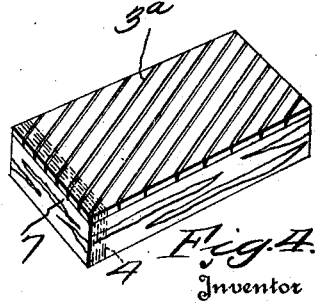
Inventor
Isaac D. Block
By John W. Farley
Attorney Patented Oct. 26, 1926.

1,604,764

UNITED STATES PATENT OFFICE.

ISAAC D. BLOCK, OF MEMPHIS, TENNESSEE.

FOOD PRODUCT.

Application filed December 9, 1925. Serial No. 74,260.

The invention relates to food products and has for its object to provide a method of preparing bacon in slabs and with the skin on the same whereby when the bacon is sliced and placed in a frying pan it will remain flat, thereby allowing the same to cook uniformly throughout its length and the slices prepared in a manner whereby they will not curl up during the frying operation.

A further object is to provide the skin of a piece of bacon with scorings, whereby when the slab is sliced, the skin side of the slices will be in a plurality of sections, and when fried will obviate curling of the slice and allow the same to remain substantially flat in the frying pan during the frying operation.

A further object is to provide a method of preparing bacon with skin thereon whereby the food value of the skin can be retained and not discarded as is now often the practice, when bacon is skinned before being cooked; and, at the same time the skin is utilized by forming a plurality of short sections along the edge of a slice of bacon for preventing curling of the other fiber during the cooking operation.

A further object is to provide a method of preparing bacon with the skin thereon whereby the slab of bacon may be sliced into thinner and a greater number of slices in preparing the bacon to be cooked. Thin slices aid in making bacon a better article of food.

Scoring of the skin may be done at any stage of the preparation of the meat for sale as bacon.

With the above and other objects in view the invention resides in the combination and arrangement of parts as hereinafter set forth, shown in the drawing, described and claimed, it being understood that change in the precise embodiment of the invention may be made within the scope of what is claimed without departing from the spirit of the invention.

In the drawings:—

Figure 1 is a perspective view of a slab of bacon, showing the longitudinal scoring in the skin thereof.

Figure 2 is a perspective view of a slice of bacon, showing the skin in section.

Figure 3 is a perspective view of a slice of bacon after the frying operation.

Figure 4 is a perspective view of a slab of bacon, showing the scoring diagonally disposed, instead of longitudinally.

Referring to the drawing, the numeral 1 designates a slab of bacon and 2 the skin on one side thereof. At the present time bacon is sold to consumers either in slabs or in slices. The cutting operation to form it into slices is generally transversely of the slab, and the skin forms a continuous strip on the edge of the slice. It has been found that this continuous strip of skin on the slice causes the slice to curl when being fried, consequently a uniform crispness is not obtained as the slice is not flat on the bottom of a frying pan while being cooked. To obviate this difficulty the slab of bacon 1 is provided with a plurality of longitudinally extending scorings 3, which may be any distance apart desired; and, it will be seen that when the slab is severed transversely, for instance on the dotted lines 4, the slices of bacon 5 will have strips of skin on one side thereof, which skin is formed from a plurality of sections 6, therefore it will be seen, when the slice is fried, the relatively short skin sections 6 will not curl, and said section will also prevent the slice 5 from curling, consequently a uniform cooking of the slice may be obtained in the frying pan throughout the length of the slice, and the common difficulty experienced in frying bacon is obviated.

Sliced bacon is usually cut in long thin strips from slabs with the skin on one side thereof, and which skin contracts to a certain extent while in the slabs during the curing process; and, where the skin on one side of the slice is uninterrupted it further contracts when placed in contact with heat, consequently causes the bacon to curl. Where the bacon curls the relation of the slice of bacon to a heated metal surface of a pan, further increases the curling operation, consequently there is a lack of uniformity in the cooking operation throughout the slice.

Some bacon is sold with the skin removed, however, the skin is palatable and nutritious and should be retained for its food value and also to obviate the expensive operation of removing the skin and consequently loss of food. It has been found by scoring the skin of the bacon as above set forth all the results obtained by skinning the bacon are obtained without the disadvantages thereof.

It has been found by scoring the bacon there is a release of the contracted skin side of the slab that results from curing, thereby making it possible to slice the slab into thinner and a greater number of slices than is ordinarily obtained, thus forming a more desirable slice for cooking and eating.

Referring to Figure 3 wherein a modified form is shown, the scorings 3 are diagonal in the skin, therefore it will be seen that the notches 7 between the skin sections 6 of the slices, when the slab is sliced on the dotted line 4 will be obtuse and acute in relation to the slice, and it is to be understood that this diagonal scoring may be used if desired.

From the above it will be seen that a method of preparing the skin of a slab of bacon is provided which will cause the skin of slices of bacon sliced from the slab to be in plurality of sections, which sections will allow the slice of bacon to lie flat in a pan during the cooking operation and will be free from curling, thereby insuring uniform cooking of the slice throughout its length.

The invention having been set forth what is claimed as new and useful is:—

1. A method of preparing slices of bacon having skin thereon comprising scoring the skin of a slab of bacon and slicing the slab angularly in relation to the scoring.

2. A method of preparing bacon slices having skin along one edge thereof and having a plurality of sections, said method comprising first scoring the skin of a slab of bacon longitudinally with a plurality of scorings and finally slicing the slab angularly in relation to the scorings.

3. A method of preparing bacon slices having skin along one edge thereof having a plurality of sections, said method comprising first scoring the skin of a slab of bacon longitudinally and finally slicing the slab transversely at a right angle to the scorings.

4. A method of preparing bacon having skin thereon comprising the step of scoring the skin of said bacon whereby upon slicing and cooking curling of the slices is prevented.

In testimony whereof I affix my signature.

ISAAC D. BLOCK.